(12) United States Patent
Ou et al.

(10) Patent No.: US 9,904,701 B2
(45) Date of Patent: Feb. 27, 2018

(54) METHOD AND APPARATUS FOR CONCURRENT ACCESS OF MIXED SERVICES

(71) Applicant: Huawei Technologies Co., Ltd., Shenzhen (CN)

(72) Inventors: Weijie Ou, Shenzhen (CN); Zhibiao Chen, Shenzhen (CN)

(73) Assignee: Huawei Technologies Co.,. Ltd., Shenzhen (CN)

( * ) Notice: Subject to any disclaimer, the term of this patent is extended or adjusted under 35 U.S.C. 154(b) by 361 days.

(21) Appl. No.: 14/713,739

(22) Filed: May 15, 2015

(65) Prior Publication Data

US 2015/0331898 A1 Nov. 19, 2015

(30) Foreign Application Priority Data

May 16, 2014 (CN) .......................... 2014 1 0206980

(51) Int. Cl.
*G06F 17/30* (2006.01)
(52) U.S. Cl.
CPC .. *G06F 17/30371* (2013.01); *G06F 17/30345* (2013.01); *G06F 17/30348* (2013.01); *G06F 17/30477* (2013.01); *G06F 17/30592* (2013.01)

(58) Field of Classification Search
None
See application file for complete search history.

(56) References Cited

U.S. PATENT DOCUMENTS

| | | |
|---|---|---|
| 5,752,026 A | 5/1998 | Fortier |
| 5,870,758 A | 2/1999 | Bamford et al. |

(Continued)

FOREIGN PATENT DOCUMENTS

| | | |
|---|---|---|
| CN | 1740978 A | 3/2006 |
| CN | 102156700 A | 8/2011 |

(Continued)

OTHER PUBLICATIONS

Funke et al., "Compacting Transactional Data in Hybrid OLTP &OLAP Databases," Proceedings of the VLDB Endowment, vol. 5, No. 11, pp. 1424-1435 (Jul. 2012).

(Continued)

*Primary Examiner* — Alex Gofman
*Assistant Examiner* — Umar Mian
(74) *Attorney, Agent, or Firm* — Leydig, Voit & Mayer, Ltd.

(57) ABSTRACT

Embodiments of the present invention provide a method and an apparatus for concurrent access of mixed services, and relate to the field of database applications, so as to implement concurrent read/write access to a database service, allow lock-free concurrency of query and modification operations, lower operation complexity, reduce overheads, reduce a waste of memory, and improve data timeliness. The method includes: dividing a data table to obtain at least one data set; breaking down a modification or query operation on the data table into at least one point operation; determining whether to-be-processed data on which point operation processing is performed is distributed in multiple columns; and if the to-be-processed data is distributed in multiple columns, determining whether the to-be-processed data is in a same data set, and performing a modification or query operation on the to-be-processed data according to a result of the determining.

9 Claims, 9 Drawing Sheets

(56) References Cited

U.S. PATENT DOCUMENTS

| | | | |
|---|---|---|---|
| 2009/0019029 A1* | 1/2009 | Tommaney | G06F 17/30471 |
| 2011/0252073 A1 | 10/2011 | Pauly | |
| 2012/0158650 A1* | 6/2012 | Andre | G06F 17/30457 |
| | | | 707/611 |
| 2012/0323873 A1 | 12/2012 | Mistry et al. | |
| 2013/0262426 A1 | 10/2013 | Chen et al. | |

FOREIGN PATENT DOCUMENTS

| | | |
|---|---|---|
| CN | 102521303 A | 6/2012 |
| CN | 102663116 A | 9/2012 |
| WO | WO 9933001 A1 | 7/1999 |

OTHER PUBLICATIONS

Sikka et al., "Efficient Transaction Processing in SAP HANA Database-The End of Column Store Myth," ACM SIGMOD International Conference on Management of Data, pp. 731-742, Association for Computing Machinery, New York, New York (2012).
"Intel Architecture Instruction Set Extensions Programming Reference," Intel Corporation, Santa Clara, California (Feb. 2012).

* cited by examiner

|  | Data set 1 | Data set 2 |  | ... |  | Data set M |
|---|---|---|---|---|---|---|
| Row identifier |  |  |  |  |  |  |
| Row 1 | First numerical value in column 1 | First numerical value in column 2 | First numerical value in column 3 | ... |  | First numerical value in column N |
| Row 2 | Second numerical value in column 1 | Second numerical value in column 2 | Second numerical value in column 3 | ... |  | Second numerical value in column N |
| ... |  |  |  |  |  |  |
| Row P | $P^{th}$ numerical value in column 1 | $P^{th}$ numerical value in column 2 | $P^{th}$ numerical value in column 3 | ... |  | $P^{th}$ numerical value in column N |

FIG. 4

METHOD AND APPARATUS FOR CONCURRENT ACCESS OF MIXED SERVICES

CROSS-REFERENCE TO RELATED APPLICATION

This application claims priority to Chinese Patent Application No. 201410206980.0, filed on May 16, 2014, which is hereby incorporated by reference in its entirety.

TECHNICAL FIELD

The present invention relates to the field of database application technologies, and in particular, to a method and an apparatus for concurrent access of mixed services.

BACKGROUND

In a service scenario of a conventional database application, frequent data updates are processed by means of online transaction processing (On-Line Transaction Processing, OLTP for short), data is imported into a data warehouse by means of an extraction-transformation-loading (Extraction-Transformation-Loading, ELT for short) operation, and on-line analytical processing (On-Line Analytical Processing, OLAP for short) is implemented in the data warehouse to support a complicated structured query language (Structured Query Language, SQL for short) query to generate a report. Because a read/write concurrent operation at the bottom layer of a database needs to be protected by using a complicated lock mechanism, frequent data updates may cause an interruption of an OLAP query and lower query efficiency. In order to improve the query efficiency, an OLTP service and an OLAP service are always not allowed to run in a same database management system; however, a direct problem brought by such a limitation is that data timeliness is poor and the report cannot reflect the latest service situation. Moreover, the design and the implementation of the database system also have to face various complicated problems brought by concurrency, for example, deadlock and priority inversion.

In order to implement read/write concurrency of OLAP and OLTP in a mixed scenario in a database application while improving the query efficiency, a solution in the prior art is: isolating an OLTP service from an OLAP service by using a data snapshot. A data snapshot is a subprocess created by using a fork( ) algorithm, where the subprocess and a main process share same data, and the OLTP service runs in the main process, and the OLAP service runs in the subprocess. Data reading/writing of the subprocess does not affect memory data. When the main process executes a data update, after an original data page is copied, a write operation is performed on a new page; therefore, data that is being accessed in the subprocess is not affected. However, in the solution in the prior art, data synchronization between the main process and the subprocess needs to depend on creation of the subprocess, which brings about unnecessary initialization overheads. In addition, when an update operation is performed in the main process, a page needs to be copied, which greatly affects performance. Large updated data occupies excessive memory.

SUMMARY

Embodiments of the present invention provide a method and an apparatus for concurrent access of mixed services, so as to implement concurrent read/write access to mixed services of a database, allow lock-free concurrency of query and modification operations, and solve the problem of performance overheads caused by isolating a data read process from a data write process by using a lock mechanism and by using a main process or a subprocess, lower operation complexity, reduce overheads, avoid memory overuse, and improve data timeliness.

To achieve the foregoing objectives, the embodiments of the present invention use the following technical solutions:

According to a first aspect, a method for concurrent access of mixed services is provided, where the method includes:

dividing a data table to obtain at least one data set, where each data set includes at least one column in the data table, and columns in the data set are contiguous;

breaking down a modification or query operation on the data table into at least one point operation;

determining whether to-be-processed data on which point operation processing is performed is distributed in multiple columns; and if the to-be-processed data is distributed in multiple columns, determining whether the to-be-processed data is in a same data set, and performing a modification or query operation on the to-be-processed data according to a result of the determining.

With reference to the first aspect, in a first possible implementation manner, the method further includes:

if the to-be-processed data is distributed in a single column, performing a modification or query operation on the to-be-processed data according to whether the to-be-processed data is within a transaction granularity range.

With reference to the first aspect, in a second possible implementation manner, the if the to-be-processed data is distributed in multiple columns, determining whether the to-be-processed data is in a same data set, and performing a modification or query operation on the to-be-processed data according to a result of the determining includes:

if the to-be-processed data is distributed in multiple columns, determining whether the to-be-processed data is in the same data set;

determining whether the to-be-processed data is within a transaction granularity range;

if the to-be-processed data is in the same data set but is not within the transaction granularity range, performing a modification or query operation on the to-be-processed data in the data set in a remote update manner;

if the to-be-processed data is in the same data set and is within the transaction granularity range, performing a modification or query operation on the to-be-processed data in the data set in a local update manner;

if the to-be-processed data is not in the same data set but is within the transaction granularity range, breaking down a modification or query operation on the to-be-processed data into a data modification or query operation corresponding to each data set in the data table, and separately performing a modification or query operation on the to-be-processed data in each data set in a local update manner; and if the to-be-processed data is not in the same data set and is not within the transaction granularity range, breaking down a modification or query operation on the to-be-processed data into a data modification or query operation corresponding to each data set in the data table, and separately performing a modification or query operation on the to-be-processed data in each data set in a remote update manner.

With reference to the first possible implementation manner, in a third possible implementation manner, the if the to-be-processed data is distributed in a single column, performing a modification or query operation on the to-be-processed data according to whether the to-be-processed data is within a transaction granularity range includes:

if the to-be-processed data is distributed in a single column, determining whether the to-be-processed data is within the transaction granularity range;

if the to-be-processed data is not within the transaction granularity range, performing a modification or query operation on the to-be-processed data in a remote update manner; and if the to-be-processed data is within the transaction granularity range, performing a modification or query operation on the to-be-processed data in a local update manner.

With reference to the first aspect or any one of the foregoing possible implementation manners, in a fourth possible implementation manner, before the dividing a data table to obtain at least one data set, the method further includes:

defining an attribute of the data table, where the attribute of the data table includes: a data type stored in the data table, a length of the data table, and an association relationship between fields in the data table; and applying for memory space according to the attribute of the data table, to create the data table and a data copy area.

With reference to the first aspect or any one of the foregoing possible implementation manners, in a fifth possible implementation manner, the method further includes:

defining an attribute of each data set in the data table as a critical section, so that modification and query operations on the to-be-processed data in the data table are simultaneously performed.

With reference to the first aspect or any one of the foregoing possible implementation manners, in a sixth possible implementation manner, the consistency of the to-be-processed data is ensured by a transactional memory system.

According to a second aspect, an apparatus for concurrent access of mixed services is provided, where the apparatus includes:

a dividing unit, configured to divide a data table to obtain at least one data set, where each data set includes at least one column in the data table, and columns in the data set are contiguous;

a break-down unit, configured to break down a modification or query operation on the data table into at least one point operation;

a determining unit, configured to determine whether to-be-processed data on which point operation processing is performed is distributed in multiple columns; and a processing unit, configured to: if the to-be-processed data is distributed in multiple columns, determine whether the to-be-processed data is in a same data set, and perform a modification or query operation on the to-be-processed data according to a result of the determining.

With reference to the second aspect, in a first possible implementation manner, the processing unit is further configured to: if the to-be-processed data is distributed in a single column, perform a modification or query operation on the to-be-processed data according to whether the to-be-processed data is within a transaction granularity range.

With reference to the second aspect, in a second possible implementation manner, the processing unit includes:

a determining module, configured to if the determining unit learns that the to-be-processed data is distributed in multiple columns determine whether the to-be-processed data is in the same data set, where the determining module is further configured to determine whether the to-be-processed data is within a transaction granularity range;

a processing module, configured to: if the determining module learns that the to-be-processed data is in the same data set but is not within the transaction granularity range, perform a modification or query operation on the to-be-processed data in the data set in a remote update manner, where the processing module is further configured to: if the determining module learns that the to-be-processed data is in the same data set and is within the transaction granularity range, perform a modification or query operation on the to-be-processed data in the data set in a local update manner;

the processing module is further configured to: if the determining module learns that the to-be-processed data is not in the same data set but is within the transaction granularity range, break down a modification or query operation on the to-be-processed data into a data modification or query operation corresponding to each data set in the data table, and separately perform a modification or query operation on the to-be-processed data in each data set in a local update manner; and the processing module is further configured to: if the determining module learns that the to-be-processed data is not in the same data set and is not within the transaction granularity range, break down a modification or query operation on the to-be-processed data into a data modification or query operation corresponding to each data set in the data table, and separately perform a modification or query operation on the to-be-processed data in each data set in a remote update manner.

With reference to the first possible implementation manner, in a third possible implementation manner, the determining module is further configured to: if the to-be-processed data is distributed in a single column, determine whether the to-be-processed data is within the transaction granularity range;

the processing module is further configured to: if the determining module learns that the to-be-processed data is not within the transaction granularity range, perform a modification or query operation on the to-be-processed data in a remote update manner; and the processing module is further configured to: if the determining module learns that the to-be-processed data is within the transaction granularity range, perform a modification or query operation on the to-be-processed data in a local update manner.

With reference to the second aspect or any one of the foregoing possible implementation manners, in a fourth possible implementation manner, the apparatus further includes:

a defining unit, configured to define an attribute of the data table, where the attribute of the data table includes: a data type stored in the data table, a length of the data table, and an association relationship between fields in the data table; and a creating unit, configured to apply for memory space according to the attribute, which is obtained by the defining unit, of the data table, to create the data table and a data copy area.

With reference to the second aspect or any one of the foregoing possible implementation manners, in a fifth possible implementation manner, the defining unit is further configured to define an attribute of each data set in the data table as a critical section, so that modification and query operations on the to-be-processed data in the data table are simultaneously performed.

With reference to the second aspect or any one of the foregoing possible implementation manners, in a sixth possible implementation manner, the consistency of the to-be-processed data is ensured by a transactional memory system.

According to the method and the apparatus for concurrent access of mixed services provided by the embodiments of the present invention, the consistency of concurrently accessed data is ensured by a transactional memory system, and a data table in which data is to be written is perpendicularly divided into different columns or different combinations of columns, to obtain a division; a modification or query operation on the division in the data table is broken down into at least one point operation; it is determined whether there are multiple data fields on which point operation processing is performed; and if there are multiple data fields on which point operation processing is performed, it is determined whether the to-be-processed data field is within a same granularity, and a modification or query operation is performed on data in the to-be-processed data field according to a result of the determining. This solution implements concurrent read/write access to mixed services of a database, allows lock-free concurrency of query and modification operations, solves the problem of performance overheads caused by isolating a data read process from a data write process by using a lock mechanism and by using a main process or a subprocess, lowers operation complexity, reduces overheads, avoids memory overuse, and improves data timeliness.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 4 is a schematic structural diagram of a column-store organization of application transactional memory according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some rather than all of the embodiments of the present invention. All other embodiments obtained by persons of ordinary skill in the art based on the embodiments of the present invention without creative efforts shall fall within the protection scope of the present invention.

Figure 1:
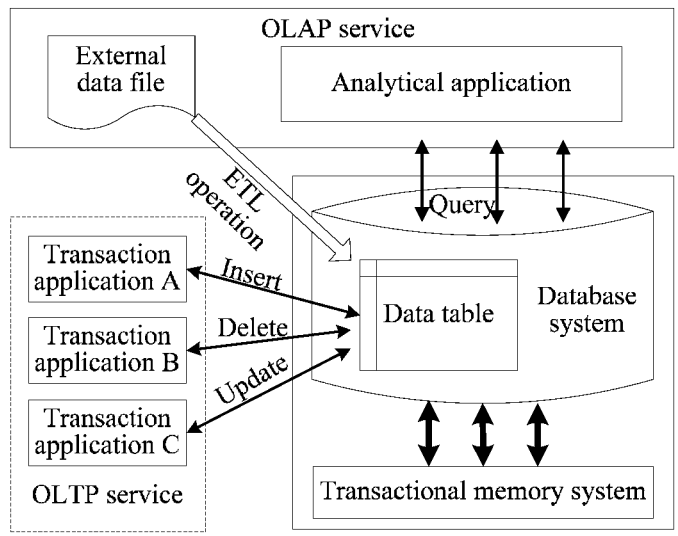
FIG. 1 is a schematic diagram of an external/internal interactive relationship of an apparatus for implementing a method for concurrent access of mixed services according to an embodiment of the present invention.

A method for concurrent access of mixed services provided by an embodiment of the present invention is implemented based on hardware devices, a schematic diagram of main apparatuses/an internal interactive relationship is shown in FIG. 1, and components involved mainly include three parts: a database system, a data organization inside a database, and a transactional memory system. An external data file in an OLAP service in an external application may be extracted by means of an extract, transform, and load (Extract Transform and Load, ETL for short) operation, and data in a data table may be queried for by using the database system and by using the method for concurrent access of mixed services provided by this embodiment; or, for an OLTP service in an external application, such as transaction application A, transaction application B, and transaction application C, data in a data table may be modified by using the method for concurrent access of mixed services provided by this embodiment, and by using the database system; and in a concurrent access process, the consistency of data is ensured by the transactional memory system, and for a specific implementation manner of the transactional memory system, reference may be made to any solution that can implement the consistency of the data in the prior art solutions.

Transactional memory makes different threads that are concurrently executed a transaction, and uses a transaction operation to replace a lock mechanism in the prior art solutions, which lowers programming complexity. A transaction is an ordered operation sequence that reads/writes a memory in a single thread manner, and characteristics of the transaction include atomicity, isolation, and consistency. Specific memory can be accessed by using a transaction, and the transactional memory system is responsible for correctly executing the transaction.

For a processor equipped with hardware transactional memory, a bottom-layer timer module of the processor traces a read-set and a write-set of the transaction, and the read-set and the write-set respectively indicate all cache lines that have been read or written in an execution process of the transaction. If a cache line in the read-set of the transaction is written by another thread, or a cache line in the write-set of the transaction is read or written by another thread, a transaction conflict occurs. In this embodiment, the hardware transactional memory may be used to ensure the transactionality of data access with a specific granularity, and avoid occurrence of the transaction conflict. A 64-byte cache line is used as a granularity.

Embodiment 1

Figure 2:
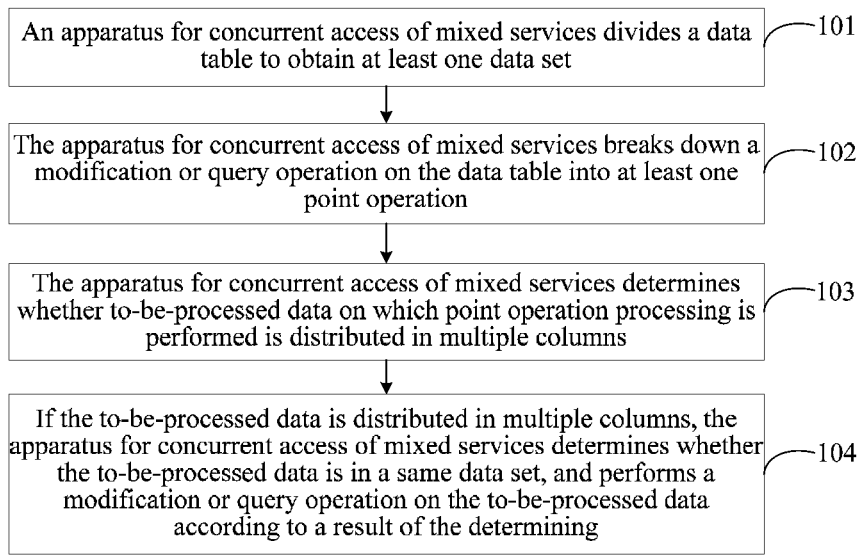
FIG. 2 is a schematic flowchart of a method for concurrent access of mixed services according to an embodiment of the present invention.

This embodiment of the present invention provides a method for concurrent access of mixed services. Referring to FIG. 2, the method includes the following steps:

101: An apparatus for concurrent access of mixed services divides a data table to obtain at least one data set.

Each data set includes at least one column in the data table, and columns in the data set are contiguous.

Specifically, in an analytical database, data is generally organized according to columns, and each field in a same record is identified by using a column offset (that is, a logical row identifier RowID). Because most of data query and modification operations only involve a specific column in a record, the data table is perpendicularly divided to obtain the data set, so that a query or modification operation is conveniently performed on data in a database.

102: The apparatus for concurrent access of mixed services breaks down a modification or query operation on the data table into at least one point operation.

The point operation is a row operation. In order to conveniently perform an operation on the data in the data table, a modification or query operation on the data table may be broken down into a row operation on the data table for implementation.

103: The apparatus for concurrent access of mixed services determines whether to-be-processed data on which point operation processing is performed is distributed in multiple columns.

104: If the to-be-processed data is distributed in multiple columns, the apparatus for concurrent access of mixed services determines whether the to-be-processed data is in a same data set, and performs a modification or query operation on the to-be-processed data according to a result of the determining.

Specifically, a size of a transaction granularity is limited by capacity of transactional memory in a hardware device. In a specific setting, in a case in which it is ensured that a system runs normally, proper numerical values may be selected as a range of the size of the transaction granularity according to an actual size of all space of the transactional memory.

In this embodiment, when the to-be-processed data is distributed in multiple columns, it is determined whether the to-be-processed data is in the same data set, it is determined whether the to-be-processed data is within a transaction granularity range, and a local update manner or a remote update manner is selected according to a specific result of the determining, to perform a modification or query operation on the to-be-processed data.

Based on the descriptions in this embodiment, the apparatus for concurrent access of mixed services may be a processor in a computer system or an actual device, which can perform corresponding steps, in a hardware device. A name of the device is not specifically limited herein, and any device that can perform corresponding steps can be used as the apparatus for concurrent access of mixed services.

According to the method for concurrent access of mixed services provided by this embodiment of the present invention, the consistency of concurrently accessed data is ensured by a transactional memory system, and a data table in which data is to be written is perpendicularly divided into different columns or different combinations of columns, to obtain a division; a modification or query operation on the division in the data table is broken down into at least one point operation; it is determined whether there are multiple data fields on which point operation processing is performed; and if there are multiple data fields on which point operation processing is performed, it is determined whether the to-be-processed data field is within a same granularity, and a modification or query operation is performed on data in the to-be-processed data field according to a result of the determining. This solution implements concurrent read/write access to mixed services of a database, allows lock-free concurrency of query and modification operations, solves the problem of performance overheads caused by isolating a data read process from a data write process by using a lock mechanism and by using a main process or a subprocess, lowers operation complexity, reduces overheads, avoids memory overuse, and improves data timeliness.

Embodiment 2

Figure 3:
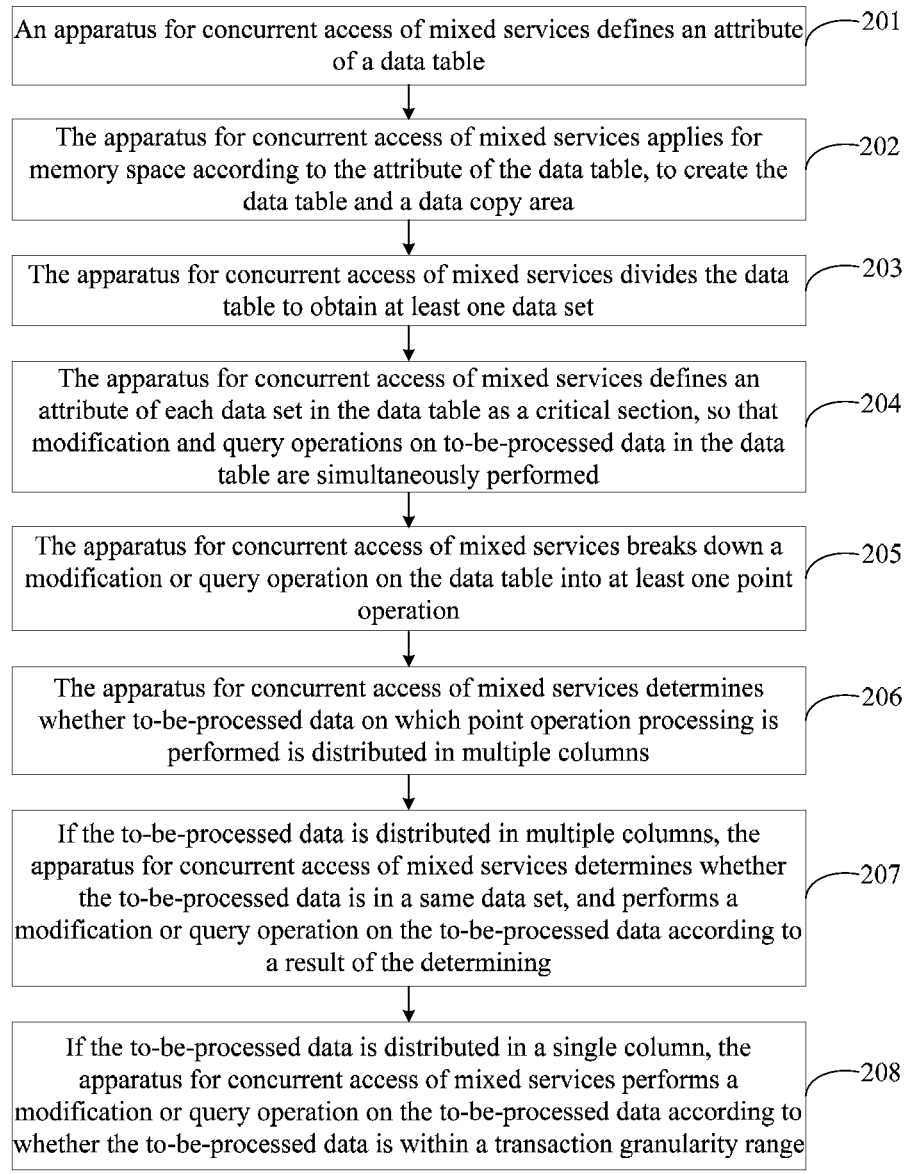
FIG. 3 is a schematic flowchart of another method for concurrent access of mixed services according to an embodiment of the present invention.

This embodiment of the present invention provides a method for concurrent access of mixed services. Referring to FIG. 3, the method includes the following steps:

201: An apparatus for concurrent access of mixed services defines an attribute of a data table.

The attribute of the data table includes: a data type stored in the data table, a length of the data table, and an association relationship between fields in the data table.

Specifically, the attribute of the data table may be implemented, by using a database language and an editing program, by the apparatus for concurrent access of mixed services.

202: The apparatus for concurrent access of mixed services applies for memory space according to the attribute of the data table, to create the data table and a data copy area.

The data table may store actual data, or may store a corresponding ID value identifying a specific location at which data is stored; and if the data table stores an ID value, the data copy area stores actual data corresponding to the ID value.

203: The apparatus for concurrent access of mixed services divides the data table to obtain at least one data set.

Each data set includes at least one column in the data table, and columns in the data set are contiguous.

Specifically, in an analytical database, data is generally organized according to columns, and each field in a same record is identified by using a column offset (that is, a logical row identifier RowID). Because most of data query and modification operations only involve a specific column in a record, the data table may be perpendicularly divided according to an association relationship between data in the data table and according to whether a total length of the data in the corresponding data table is within a transaction granularity range, to obtain the data set, so that a query or modification operation is conveniently performed on data in a database. As shown in FIG. 4, the first column is independently divided into a data set, and the second column and the third column are together divided into a data set. In order to implement concurrent modification and query (that is, read/write) access, a total length of fields in each record in the data set does not exceed a granularity of hardware transactional memory. For a special situation of a variable-length field and a special situation in which multiple columns are associated, only an ID value, in the data copy area, of the actual data is stored in the data set, and the actual data corresponding to the ID value is stored in the data copy area.

204: The apparatus for concurrent access of mixed services defines an attribute of each data set in the data table as a critical section, so that modification and query operations on to-be-processed data in the data table are simultaneously performed.

Specifically, before modification and query operations are performed on the data table, each data set in the data table needs to be defined as the critical section first. During actual execution, when a modification or query operation is performed on the data table, a corresponding data set in the data table may be defined as a critical section according to an object, on which an operation is specifically performed, in the data table. The critical section is used to ensure that a modification or query operation is not interfered by another query or modification operation when the modification or query operation is performed on data in the data set. For the data set, corresponding to the critical section, in the data table, the consistency of the data can be ensured by using transactional memory; in this way, modification and query operations on the data in the data set can be concurrently executed, that is, concurrent read/write access to the data in the data table is implemented.

205: The apparatus for concurrent access of mixed services breaks down a modification or query operation on the data table into at least one point operation.

The point operation is a row operation. In order to conveniently perform an operation on the data in the data table, a modification or query operation on the data table may be broken down into a row operation on the data table for implementation.

206: The apparatus for concurrent access of mixed services determines whether to-be-processed data on which point operation processing is performed is distributed in multiple columns.

207: If the to-be-processed data is distributed in multiple columns, the apparatus for concurrent access of mixed services determines whether the to-be-processed data is in a same data set, and performs a modification or query operation on the to-be-processed data according to a result of the determining.

208: If the to-be-processed data is distributed in a single column, the apparatus for concurrent access of mixed services performs a modification or query operation on the to-be-processed data according to whether the to-be-processed data is within a transaction granularity range.

The consistency of the to-be-processed data is ensured by a transactional memory system.

Specifically, a local update manner or a remote update manner is selected according to a result of the determining of whether the to-be-processed data is within the transaction granularity range, to perform a modification or query operation on the data.

According to the method for concurrent access of mixed services provided by this embodiment of the present invention, the consistency of concurrently accessed data is ensured by a transactional memory system, and a data table in which data is to be written is perpendicularly divided into different columns or different combinations of columns, to obtain a division; a modification or query operation on the division in the data table is broken down into at least one point operation; it is determined whether there are multiple data fields on which point operation processing is performed; and if there are multiple data fields on which point operation processing is performed, it is determined whether the to-be-processed data field is within a same granularity, and a modification or query operation is performed on data in the to-be-processed data field according to a result of the determining. This solution implements concurrent read/write access to mixed services of a database, allows lock-free concurrency of query and modification operations, solves the problem of performance overheads caused by isolating a data read process from a data write process by using a lock mechanism and by using a main process or a subprocess, lowers operation complexity, reduces overheads, avoids memory overuse, and improves data timeliness.

Embodiment 3

Figure 5A:
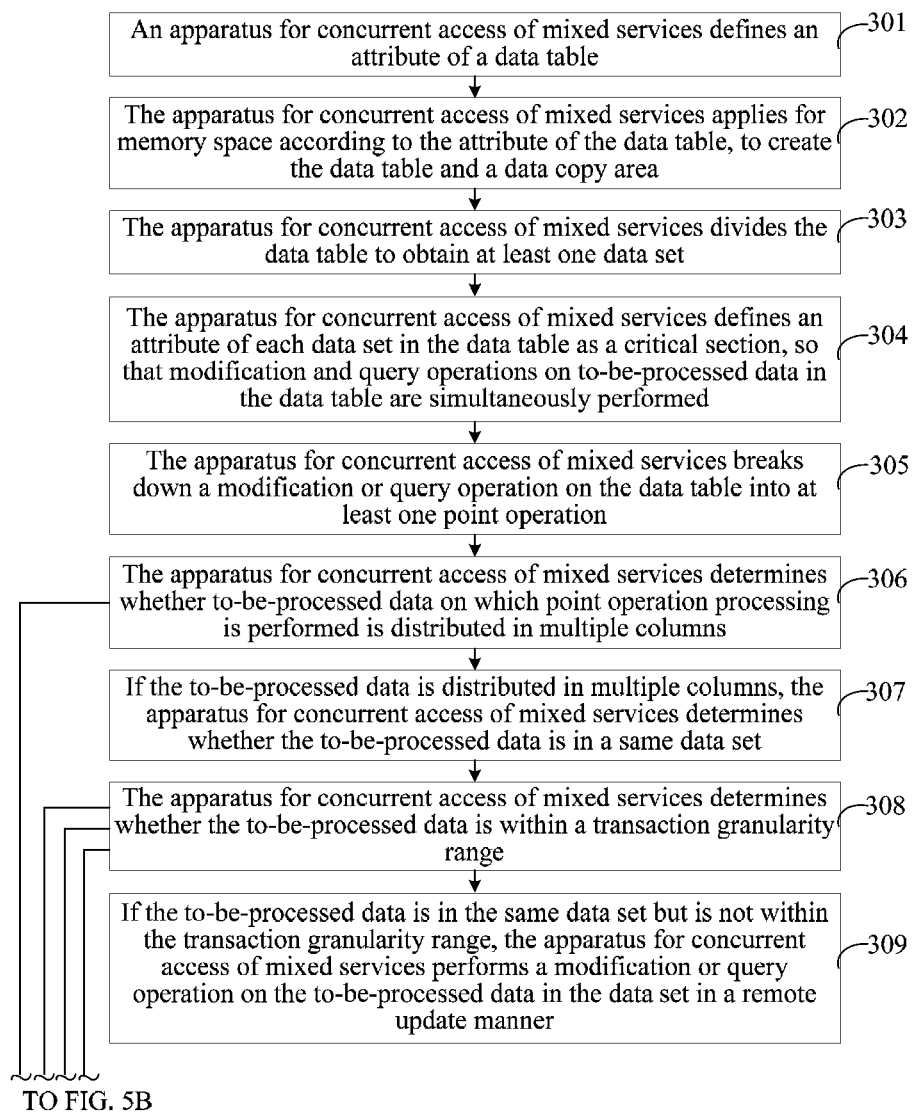
FIG. 5A and FIG. 5B are a schematic flowchart of still another method for concurrent access of mixed services according to an embodiment of the present invention.
Figure 5B:
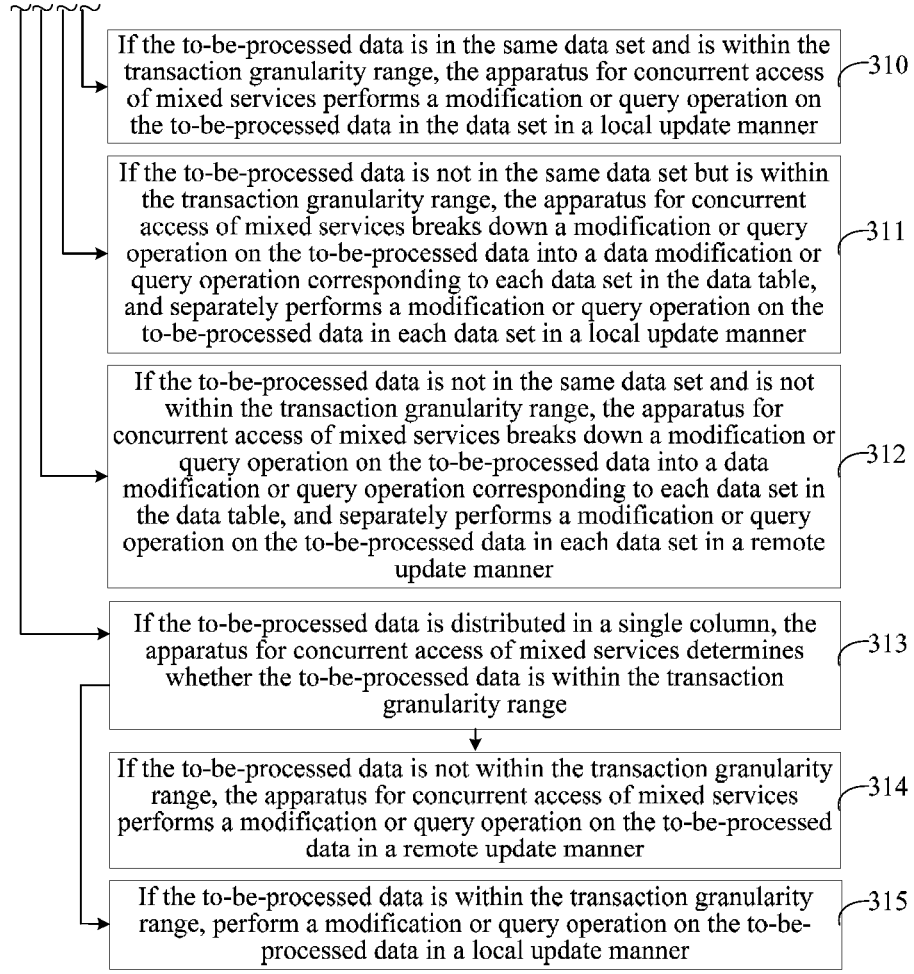

This embodiment of the present invention provides a method for concurrent access of mixed services. Referring to FIG. 5A and FIG. 5B, the method includes the following steps:

301: An apparatus for concurrent access of mixed services defines an attribute of a data table.

The attribute of the data table includes: a data type stored in the data table, a length of the data table, and an association relationship between fields in the data table.

Specifically, the attribute of the data table may be implemented, by using a database language and an editing program, by the apparatus for concurrent access of mixed services.

302: The apparatus for concurrent access of mixed services applies for memory space according to the attribute of the data table, to create the data table and a data copy area.

The data table may store actual data, or may store a corresponding ID numerical value identifying a specific location at which data is stored; and if the data table stores an ID value, the data copy area stores actual data corresponding to the ID value.

303: The apparatus for concurrent access of mixed services divides the data table to obtain at least one data set.

Each data set includes at least one column in the data table, and columns in the data set are contiguous.

Specifically, in an analytical database, data is generally organized according to columns, and each field in a same record is identified by using a column offset (that is, a logical row identifier RowID). Because most of data query and modification operations only involve a specific column in a record, the data table may be perpendicularly divided according to an association relationship between data in the data table and according to whether a total length of the data in the corresponding data table is within a transaction granularity range, to obtain the data set, so that a query or modification operation is conveniently performed on data in a database. As shown in FIG. 4, the first column is independently divided into a data set, and the second column and the third column are together divided into a data set. In order to implement concurrent modification and query (that is, read/write) access, a total length of fields in each record in the data set does not exceed a granularity of hardware transactional memory. For a special situation of a variable-length field and a special situation in which multiple columns are associated, only an ID value, in the data copy area, of the actual data is stored in the data set, and the actual data corresponding to the ID value is stored in the data copy area.

304: The apparatus for concurrent access of mixed services defines an attribute of each data set in the data table as a critical section, so that modification and query operations on to-be-processed data in the data table are simultaneously performed.

Specifically, before modification and query operations are performed on the data table, each data set in the data table needs to be defined as the critical section first. During actual execution, when a modification or query operation is performed on the data table, a corresponding data set in the data table may be defined as a critical section according to an object, on which an operation is specifically performed, in the data table. The critical section is used to ensure that a modification or query operation is not interfered by another query or modification operation when the modification or query operation is performed on data in the data set. For the data set, corresponding to the critical section, in the data table, the consistency of the data can be ensured by using transactional memory; in this way, modification and query operations on the data in the data set can be concurrently executed, that is, concurrent read/write access to the data in the data table is implemented.

305: The apparatus for concurrent access of mixed services breaks down a modification or query operation on the data table into at least one point operation.

The point operation is a row operation. A range to which the data in the data table and on which a modification or query operation needs to be performed belongs is broken down into at least one row operation, that is, break-down of a modification or query operation on the data table into at least one point operation is implemented.

306: The apparatus for concurrent access of mixed services determines whether to-be-processed data on which point operation processing is performed is distributed in multiple columns.

It may be learned, by determining whether the to-be-processed data on which the point operation processing is performed exists in multiple columns in the data table, whether the to-be-processed data on which the point operation processing is performed is distributed in multiple columns; if the to-be-processed data exists in multiple columns in the data table, the to-be-processed data is distributed in multiple columns; and if the to-be-processed data only exists in one column in the data table, the to-be-processed data is distributed in a single column.

After it is determined in step 306 whether the to-be-processed data on which the point operation processing is performed is distributed in multiple columns, according to a result of the determining of whether the to-be-processed data on which the point operation processing is performed is distributed in multiple columns, if the to-be-processed data is distributed in multiple columns, step 307 to step 312 are performed, and if the to-be-processed data is distributed in a single column, step 313 to step 315 are performed.

307: If the to-be-processed data is distributed in multiple columns, the apparatus for concurrent access of mixed services determines whether the to-be-processed data is in a same data set.

308: The apparatus for concurrent access of mixed services determines whether the to-be-processed data is within a transaction granularity range.

Specifically, a size of a transaction granularity is limited by capacity of transactional memory in a hardware device. In a specific setting, in a case in which it is ensured that a system runs normally, proper numerical values may be selected as a range of the size of the transaction granularity according to an actual size of all space of the transactional memory.

It should be noted that there is no definite order for performing step 307 of determining whether the to-be-processed data is in a same data set and step 308 of determining whether the to-be-processed data is within a transaction granularity range, that is, step 307 and step 308 may be simultaneously performed, or step 307 may be performed after step 308, or step 307 may be performed before step 308; an order for performing step 307 and step 308 is not uniquely limited herein, and during actual execution, a specific implementation order is determined according to an actual operating environment.

After step 308, according to a result of the determining of whether the to-be-processed data is in the same data set and whether the to-be-processed data is within the transaction granularity range, if the to-be-processed data is in the same data set but is not within the transaction granularity range, step 309 is performed; if the to-be-processed data is in the same data set and is within the transaction granularity range, step 310 is performed; if the to-be-processed data is not in the same data set but is within the transaction granularity range, step 311 is performed; and if the to-be-processed data is not in the same data set and is not within the transaction granularity range, step 312 is performed.

309: If the to-be-processed data is in the same data set but is not within the transaction granularity range, the apparatus for concurrent access of mixed services performs a modification or query operation on the to-be-processed data in the data set in a remote update manner.

The remote update manner may specifically use an out_place manner. The out_place manner is used because the data table stores, instead of actual data, an ID value, corresponding to the actual data, in the data copy area.

310: If the to-be-processed data is in the same data set and is within the transaction granularity range, the apparatus for concurrent access of mixed services performs a modification or query operation on the to-be-processed data in the data set in a local update manner.

The local update manner may specifically use an in place manner.

All modification operations that are performed on the to-be-processed data and appear in this embodiment are write operations performed on the to-be-processed data. For a definition of a write operation, reference may be made to a definition in the prior art solutions, which is not specifically limited herein. All query operations that are performed on the to-be-processed data and appear in this embodiment are read operations performed on the to-be-processed data. For a definition of a read operation, reference may be made to a definition in the prior art solutions, which is not specifically limited herein.

311: If the to-be-processed data is not in the same data set but is within the transaction granularity range, the apparatus for concurrent access of mixed services breaks down a modification or query operation on the to-be-processed data into a data modification or query operation corresponding to each data set in the data table, and separately performs a modification or query operation on the to-be-processed data in each data set in a local update manner.

Specifically, break-down of a modification operation on the to-be-processed data into a data modification operation corresponding to each data set in the data table may be implemented by using a data set that breaks down the modification operation into the data modification operation corresponding to the data set in the data table in which the data on which the modification operation is performed is located. Specifically, break-down of a query operation on the to-be-processed data into a data query operation corresponding to each data set in the data table may be implemented by using a data set that breaks down the query operation into the data query operation corresponding to the data set in the data table in which the data on which the query operation is performed is located.

312: If the to-be-processed data is not in the same data set and is not within the transaction granularity range, the apparatus for concurrent access of mixed services breaks down a modification or query operation on the to-be-processed data into a data modification or query operation corresponding to each data set in the data table, and separately performs a modification or query operation on the to-be-processed data in each data set in a remote update manner.

313: If the to-be-processed data is distributed in a single column, the apparatus for concurrent access of mixed services determines whether the to-be-processed data is within the transaction granularity range.

It may be learned, by determining whether a total data length of the to-be-processed data exceeds a range limited by capacity of transactional memory, whether the to-be-processed data is within the transaction granularity range.

314: If the to-be-processed data is not within the transaction granularity range, the apparatus for concurrent access of mixed services performs a modification or query operation on the to-be-processed data in a remote update manner.

315: If the to-be-processed data is within the transaction granularity range, the apparatus for concurrent access of mixed services performs a modification or query operation on the to-be-processed data in a local update manner.

In this embodiment, the consistency of the to-be-processed data is ensured by a transactional memory system.

It should be noted that, when a modification operation is performed on the data in the data table, if the data table stores an ID value instead of actual data, it is required to perform a modification operation on data in the data copy area first in the out_place manner, then update a pointer in a corresponding field, modify the ID value in the data table, and simultaneously delete original data. An update operation, an insertion operation, or a deletion operation performed on data is used as an example for description. A specific process may be that: if the update operation is performed on the data, updated new data is first inserted into the data copy area, an ID value, corresponding to the new data, in the data copy area is added to the data table, an ID value corresponding to a pointer of the original data in the data copy area is set to unavailable, and the original data is simultaneously deleted; if the insertion operation is performed on the data, new data that needs to be inserted is first inserted into the data copy area, and then an ID value, corresponding to the new data, in the data copy area is added to the data table; and if the deletion operation is performed on the data, the original data that needs to be deleted is first deleted from the data copy area, and then the ID value, corresponding to the data, in the data table is set to unavailable. When a query operation is performed on the data in the data table, if the data table stores an ID value instead of actual data, the ID value is obtained from the data table first, and then the actual data is read at a corresponding location in the data copy area according to the obtained ID value.

Based on the descriptions in this embodiment, the apparatus for concurrent access of mixed services may be a processor in a computer system or an actual device, which can perform corresponding steps, in a hardware device. A name of the device is not specifically limited herein, and any device that can perform corresponding steps can be used as the apparatus for concurrent access of mixed services.

According to the method for concurrent access of mixed services provided by this embodiment of the present invention, the consistency of concurrently accessed data is ensured by a transactional memory system, and a data table in which data is to be written is perpendicularly divided into different columns or different combinations of columns, to obtain a division; a modification or query operation on the division in the data table is broken down into at least one point operation; it is determined whether there are multiple data fields on which point operation processing is performed; and if there are multiple data fields on which point operation processing is performed, it is determined whether the to-be-processed data field is within a same granularity, and a modification or query operation is performed on data in the to-be-processed data field according to a result of the determining. This solution implements concurrent read/write access to mixed services of a database, allows lock-free concurrency of query and modification operations, solves the problem of performance overheads caused by isolating a data read process from a data write process by using a lock mechanism and by using a main process or a subprocess, lowers operation complexity, reduces overheads, avoids memory overuse, and improves data timeliness.

Based on the method for concurrent access of mixed services provided by the foregoing embodiment, the present invention provides operation processes that are applied to software and implement the method for concurrent access of mixed services: 1. a process of importing a data file into a database: an attribute of a data table to be imported is defined by using a data definition language (data definition language, DDL for short) table creation statement; and the database applies for memory space according to the attribute of the data table, to create a perpendicular division and a corresponding data copy area to store data; 2. a process of separately writing data in each column into a corresponding division: a tool is imported to parse a data file, and records, that is, data, are sent to a server end in batches; the server end inserts the received records into the data table one by one; each record is inserted into data in each perpendicular division, and a perpendicular division in which each record is written is defined as a critical section, that is, a memory write operation within a transaction granularity is executed; and for a division that stores only a copy ID, insertion is completed by using two steps: first, a new data copy is added and an ID is acquired, and then, a corresponding ID in a field is updated; 3. a process of querying for concurrent data (that is, a read operation): after querying for a request, a client sends a structured query language (Structured Query Language, SQL for short) statement to a database server; and after parsing the SQL statement, the database server obtains a data table that needs to be scanned and a scanning range, which is also applicable to scanning of an index according to an ID; then, the data table is scanned one by one according to the obtained scanning range; querying on each record may be broken down into read operations on different perpendicular divisions, and it is ensured, by defining a critical section of transactional memory, that read operations in divisions meet the transactionality; data of the latest value stored in a field in the data table may be directly acquired from the field in the data table to directly perform a read operation; and for a scanning range with a data copy area, the latest ID field corresponding to the data copy area may be first read from the data table, and then, the data copy area corresponding to the division is accessed according to the latest read ID, to acquire an actual value of a data copy; where, it should be noted that different query operations may also be concurrently executed; and 4. a process of modifying concurrent data (that is, a write operation): the client sends the SQL statement to the server end; the server end parses the SQL statement and finds a corresponding data table that needs to be modified; an update of each record is broken down into modification of data in each perpendicular division, and a critical section operation is defined, that is, a memory write operation within the transaction granularity is executed; and for the division that stores only the copy ID, an update is completed by using three steps: first, a new data copy is added to the data copy area and an ID is acquired, then a corresponding ID in a corresponding field in the data table is updated, and finally, a data copy to which an original ID points is set to unavailable.

Certainly, it should be noted that a feasible implementation manner is merely used herein to describe a process in which application software implements the method for concurrent access of mixed services, and it is not limited that only the process listed in the present invention can be used. During an actual operation, a proper software implementation statement and process may be selected according to an actual execution environment.

Embodiment 4

Figure 6:
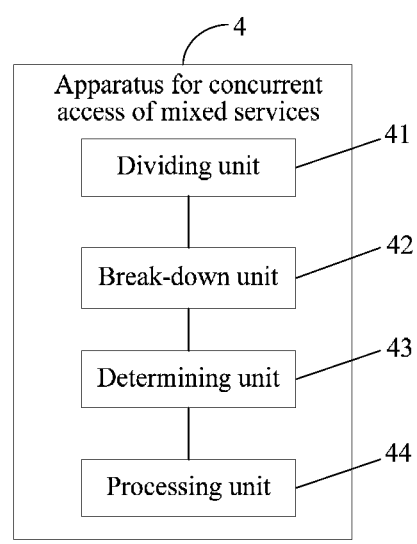
FIG. 6 is a schematic structural diagram of an apparatus for concurrent access of mixed services according to an embodiment of the present invention.

This embodiment of the present invention provides an apparatus 4 for concurrent access of mixed services, where the apparatus 4 is configured to implement the method for concurrent access of mixed services provided by the method embodiment corresponding to any one of FIG. 2, FIG. 3, and FIG. 5A and FIG. 5B. Referring to FIG. 6, the apparatus 4 includes: a dividing unit 41, a break-down unit 42, a determining unit 43, and a processing unit 44.

The dividing unit 41 is configured to divide a data table to obtain at least one data set.

Each data set includes at least one column in the data table, and columns in the data set are contiguous.

The break-down unit 42 is configured to break down a modification or query operation on the data table into at least one point operation.

The determining unit 43 is configured to determine whether to-be-processed data on which point operation processing is performed is distributed in multiple columns.

The processing unit 44 is configured to: if the determining unit 43 learns that the to-be-processed data is distributed in multiple columns, determine whether the to-be-processed data is in a same data set, and perform a modification or query operation on the to-be-processed data according to a result of the determining.

According to the apparatus for concurrent access of mixed services provided by this embodiment of the present invention, the consistency of concurrently accessed data is ensured by a transactional memory system, and a data table in which data is to be written is perpendicularly divided into different columns or different combinations of columns, to obtain a division; a modification or query operation on the division in the data table is broken down into at least one point operation; it is determined whether there are multiple data fields on which point operation processing is performed; and if there are multiple data fields on which point operation processing is performed, it is determined whether the to-be-processed data field is within a same granularity, and a modification or query operation is performed on data in the to-be-processed data field according to a result of the determining. This solution implements concurrent read/write access to mixed services of a database, allows lock-free concurrency of query and modification operations, avoids the problem of performance overheads caused by isolating a data read process from a data write process by using a lock mechanism and by using a main process or a subprocess, lowers operation complexity, reduces overheads, avoids memory overuse, and improves data timeliness.

Further, the processing unit 44 is further configured to: if the determining unit 43 learns that the to-be-processed data is distributed in a single column, perform a modification or query operation on the to-be-processed data according to whether the to-be-processed data is within a transaction granularity range.

Figure 7:
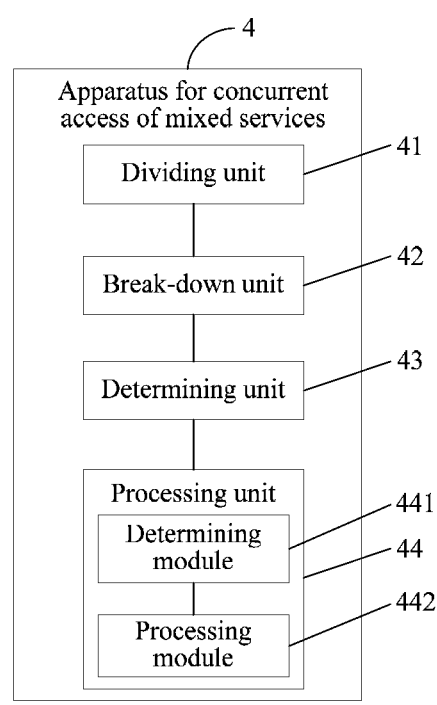
FIG. 7 is a schematic structural diagram of another apparatus for concurrent access of mixed services according to an embodiment of the present invention.

Specifically, referring to FIG. 7, the processing unit 44 includes: a determining module 441 and a processing module 442.

The determining module 441 is configured to: if the determining unit 43 learns that the to-be-processed data is distributed in multiple columns, determine whether the to-be-processed data is in the same data set.

The determining module 441 is further configured to determine whether the to-be-processed data is within the transaction granularity range.

The processing module 442 is configured to: if the determining module 441 learns that the to-be-processed data is in the same data set but is not within the transaction granularity range, perform a modification or query operation on the to-be-processed data in the data set in a remote update manner.

The processing module 442 is further configured to: if the determining module 441 learns that the to-be-processed data is in the same data set and is within the transaction granularity range, perform a modification or query operation on the to-be-processed data in the data set in a local update manner.

Further, optionally, the processing module 442 is further configured to: if the determining module 441 learns that the to-be-processed data is in the same data set and is within the transaction granularity range, break down a modification or query operation on the to-be-processed data into a data modification or query operation corresponding to each data set in the data table, and separately perform a modification or query operation on the to-be-processed data in each data set in a local update manner.

The processing module 442 is further configured to: if the determining module 441 learns that the to-be-processed data is in the same data set but is not within the transaction granularity range, break down a modification or query operation on the to-be-processed data into a data modification or query operation corresponding to each data set in the data table, and separately perform a modification or query operation on the to-be-processed data in each data set in a remote update manner.

Further, optionally, the determining module 441 is further configured to: if the to-be-processed data is distributed in a single column, determine whether the to-be-processed data is within the transaction granularity range.

The processing module 442 is further configured to: if the determining module 441 learns that the to-be-processed data is not within the transaction granularity range, perform a modification or query operation on the to-be-processed data in a remote update manner.

The processing module 442 is further configured to: if the determining module 441 learns that the to-be-processed data is within the transaction granularity range, perform a modification or query operation on the to-be-processed data in a local update manner.

Figure 8:
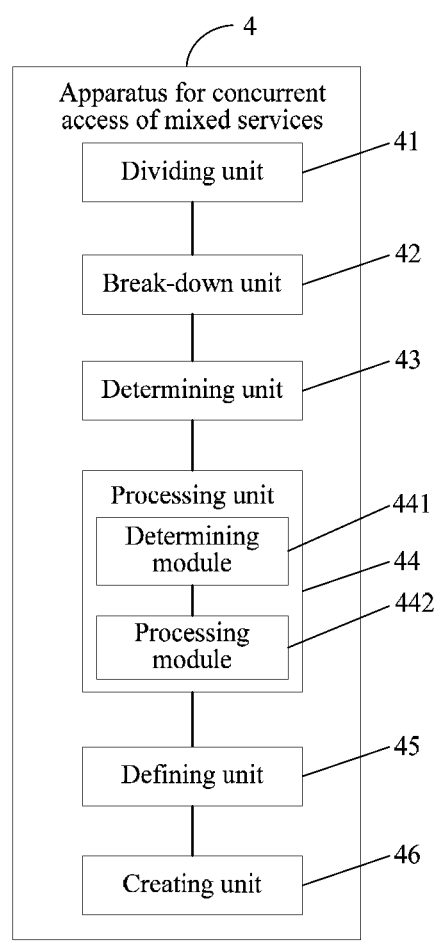
FIG. 8 is a schematic structural diagram of still another apparatus for concurrent access of mixed services according to an embodiment of the present invention.

Further, referring to FIG. 8, the apparatus 4 further includes: a defining unit 45 and a creating unit 46.

The defining unit 45 is configured to define an attribute of the data table.

The attribute of the data table includes: a data type stored in the data table, a length of the data table, and an association relationship between fields in the data table.

The creating unit 46 is configured to apply for memory space according to the attribute, which is obtained by the defining unit 45, of the data table, to create the data table and a data copy area.

The defining unit 45 is further configured to define an attribute of each data set in the data table as a critical section, so that modification and query operations on the to-be-processed data in the data table are simultaneously performed.

In this embodiment, the consistency of the to-be-processed data is ensured by a transactional memory system.

It should be noted that for implementation manners and interaction processes of the units and the modules in the apparatus for concurrent access of mixed services in this embodiment, reference may be made to related descriptions in the corresponding method embodiments.

According to the apparatus for concurrent access of mixed services provided by this embodiment of the present invention, the consistency of concurrently accessed data is ensured by a transactional memory system, and a data table in which data is to be written is perpendicularly divided into different columns or different combinations of columns, to obtain a division; a modification or query operation on the division in the data table is broken down into at least one point operation; it is determined whether there are multiple data fields on which point operation processing is performed; and if there are multiple data fields on which point operation processing is performed, it is determined whether the to-be-processed data field is within a same granularity, and a modification or query operation is performed on data in the to-be-processed data field according to a result of the determining. This solution implements concurrent read/write access to mixed services of a database, allows lock-free concurrency of query and modification operations, solves the problem of performance overheads caused by isolating a data read process from a data write process by using a lock mechanism and by using a main process or a subprocess, lowers operation complexity, reduces overheads, avoids memory overuse, and improves data timeliness.

Embodiment 5

Figure 9:
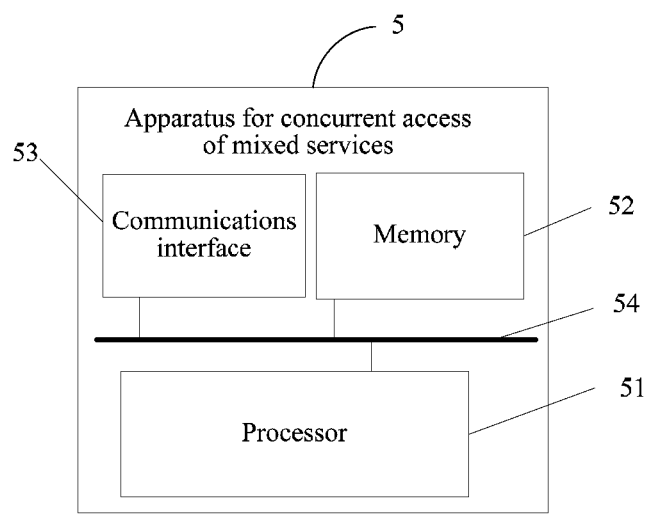
FIG. 9 is a schematic structural diagram of yet another apparatus for concurrent access of mixed services according to an embodiment of the present invention.

This embodiment of the present invention provides an apparatus 5 for concurrent access of mixed services, where the apparatus 5 is configured to implement the method for concurrent access of mixed services provided by the method embodiment corresponding to any one of FIG. 2, FIG. 3, and FIG. 5A and FIG. 5B. Referring to FIG. 9, the apparatus 5 includes: at least one processor 51, a memory 52, a communications interface 53, and a bus 54, where the at least one processor 51, the memory 52, and the communications interface 53 are connected and complete mutual communication through the bus 54, and the memory 51 is configured to store program code.

The bus 54 may be an industry standard architecture (Industry Standard Architecture, ISA for short) bus, a peripheral component interconnect (Peripheral Component Interconnect, PCI for short) bus, or an Extended Industry Standard Architecture (Extended Industry Standard Architecture, EISA for short) bus. The bus 54 may be classified into an address bus, a data bus, a control bus, or the like. For the convenience of representation, the bus 54 in FIG. 9 is represented by only using a bold line, which does not mean that there is only one bus or only a bus of one type.

The memory 52 is configured to store the program code, where the program code includes an operation instruction. The memory 52 may include a high-speed RAM memory, and may further include a non-volatile memory (non-volatile memory), for example, at least one magnetic disk memory.

The processor 51 may be a central processing unit (Central Processing Unit, CPU for short), an application specific integrated circuit (Application Specific Integrated Circuit, ASIC for short), or is configured to be one or more integrated circuits for implementing this embodiment of the present invention.

The communications interface 53 is mainly configured to implement communication between the apparatuses in this embodiment.

The processor 51 is further configured to invoke the program code in the memory 52 to execute the following operations:

dividing a data table to obtain at least one data set, where each data set includes at least one column in the data table, and columns in the data set are contiguous;

breaking down a modification or query operation on the data table into at least one point operation;

determining whether to-be-processed data on which point operation processing is performed is distributed in multiple columns; and if the to-be-processed data is distributed in multiple columns, determining whether the to-be-processed data is in a same data set, and performing a modification or query operation on the to-be-processed data according to a result of the determining.

Further, the processor 51 is further configured to: if the to-be-processed data is distributed in a single column, perform a modification or query operation on the to-be-processed data according to whether the to-be-processed data is within a transaction granularity range.

Specifically, the processor 51 is specifically configured to perform the following steps:

if the to-be-processed data is distributed in multiple columns, determining whether the to-be-processed data is in the same data set;

determining whether the to-be-processed data is within the transaction granularity range;

if the to-be-processed data is in the same data set but is not within the transaction granularity range, performing a modification or query operation on the to-be-processed data in the data set in a remote update manner; and if the to-be-processed data is in the same data set and is within the transaction granularity range, performing a modification or query operation on the to-be-processed data in the data set in a local update manner.

Optionally, the processor 51 is further specifically configured to perform the following steps:

if the to-be-processed data is not in the same data set but is within the transaction granularity range, breaking down a modification or query operation on the to-be-processed data into a data modification or query operation corresponding to each data set in the data table, and separately performing a modification or query operation on the to-be-processed data in each data set in a local update manner; and if the to-be-processed data is not in the same data set and is not within the transaction granularity range, breaking down a modification or query operation on the to-be-processed data into a data modification or query operation corresponding to each data set in the data table, and separately performing a modification or query operation on the to-be-processed data in each data set in a remote update manner.

Further, the processor 51 is further configured to: if the to-be-processed data is distributed in a single column, determine whether the to-be-processed data is within the transaction granularity range.

The processor 51 is further configured to: if the to-be-processed data is not within the transaction granularity range, perform a modification or query operation on the to-be-processed data in a remote update manner.

Optionally, the processor 51 is further configured to: if the to-be-processed data is within the transaction granularity range, perform a modification or query operation on the to-be-processed data in a local update manner.

Further, the processor 51 is further configured to perform the following steps:

defining an attribute of the data table, where the attribute of the data table includes: a data type stored in the data table, a length of the data table, and an association relationship between fields in the data table; and applying for memory space according to the attribute of the data table, to create the data table and a data copy area.

Further, the processor 51 is further configured to define an attribute of each data set in the data table as a critical section, so that modification and query operations on the to-be-processed data in the data table are simultaneously performed.

In this embodiment, the consistency of the to-be-processed data is ensured by a transactional memory system.

It should be noted that for implementation manners and interaction processes of the devices in the apparatus for concurrent access of mixed services in this embodiment, reference may be made to related descriptions in the corresponding method embodiments.

According to the apparatus for concurrent access of mixed services provided by this embodiment of the present invention, the consistency of concurrently accessed data is ensured by a transactional memory system, and a data table in which data is to be written is perpendicularly divided into different columns or different combinations of columns, to obtain a division; a modification or query operation on the division in the data table is broken down into at least one point operation; it is determined whether there are multiple data fields on which point operation processing is performed; and if there are multiple data fields on which point operation processing is performed, it is determined whether the to-be-processed data field is within a same granularity, and a modification or query operation is performed on data in the to-be-processed data field according to a result of the determining. This solution implements concurrent read/write access to mixed services of a database, allows lock-free concurrency of query and modification operations, solves the problem of performance overheads caused by isolating a data read process from a data write process by using a lock mechanism and by using a main process or a subprocess, lowers operation complexity, reduces overheads, avoids memory overuse, and improves data timeliness.

It may be clearly understood by persons skilled in the art that, for the purpose of convenient and brief description, only the division of the foregoing functional modules is described by using an example, and in an actual application, the foregoing functions may be accomplished by different functional modules according to a requirement, that is, the inner structure of the apparatus is divided into different functional modules to accomplish all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely a logical function division and may be other divisions in actual implementation. For example, multiple units or components may be combined or integrated into another system, or some features may be ignored or not performed.

In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of this application.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

The foregoing embodiments are merely intended for describing the technical solutions of this application rather than limiting this application. Although this application is described in detail with reference to the foregoing embodiments, persons of ordinary skill in the art should understand that they may still make modifications to the technical solutions described in the foregoing embodiments or make equivalent replacements to some of the technical features thereof, as long as these modifications or replaces do not cause the essence of corresponding technical solutions to depart from the spirit and scope of the technical solutions of the embodiments of this application. Therefore, the protection scope of the present invention shall be subject to the protection scope of the claims.

What is claimed is:

1. A method for concurrent access of mixed services, comprising:

dividing, by a processor, a data table into a plurality of data sets, wherein each data set comprises at least one column in the data table, and columns in the data set are contiguous;

breaking down, by the processor, a modification or query operation on the data table into one or more row operations;

determining, by the processor, whether a row operation of the one or more row operations is applicable to data distributed across multiple columns;

in response to determining that the row operation is applicable to data distributed across multiple columns, determining, by the processor, whether or not the data distributed across the multiple columns is contained within a single data set and whether or not the size of the data distributed across the multiple columns is within a transaction granularity range; and processing, by the processor, the data distributed across the multiple columns based on whether or not the data distributed across the multiple columns is contained within a single data set and whether or not the size of the data distributed across the multiple columns is within the transaction granularity range, wherein processing the data distributed across the multiple columns based on whether or not the data distributed across the multiple columns is contained within a single data set and whether or not the size of the data distributed across the multiple columns is within the transaction granularity range comprises:

if the data distributed across the multiple columns is in a single data set and is within the transaction granularity range, performing a modification or query operation on the data distributed across the multiple columns in a local update manner;

if the data distributed across the multiple columns is not in a single data set and is within the transaction granularity range, performing a modification or query operation separately for data of each data set within the data distributed across the multiple columns in a local update manner; and if the data distributed across the multiple columns is not in a single data set and is not within the transaction granularity range, performing a modification or query operation separately for data of each data set within the data distributed across the multiple columns in a remote update manner.

2. The method according to claim 1, before dividing the data table, the method further comprises:

defining an attribute of the data table, wherein the attribute of the data table comprises: a data type stored in the data table, a length of the data table, and an association relationship between columns in the data table; and applying for memory space according to the attribute of the data table, to create the data table and a data copy area.

3. The method according to claim 1, wherein the method further comprises:

defining an attribute of each data set in the data table as a critical section to facilitate modification and query operations being simultaneously performed.

4. The method according to claim 1, wherein the consistency of the data distributed across the multiple columns is ensured by a transactional memory system.

5. A non-transitory computer-readable medium having processor-executable instructions stored thereon for concurrent access of mixed services, the processor-executable instructions, when executed by a processor, facilitating performance of the following:

dividing a data table into a plurality of data sets, wherein each data set comprises at least one column in the data table, and columns in the data set are contiguous;

breaking down a modification or query operation on the data table into one or more row operations;

determining whether a row operation of the one or more row operations is applicable to data distributed across multiple columns;

in response to determining that the row operation is applicable to data distributed across multiple columns, determining whether or not the data distributed across the multiple columns is contained within a single data set and whether or not the size of the data distributed across the multiple columns is within a transaction granularity range; and processing the data distributed across the multiple columns based on whether or not the data distributed across the multiple columns is contained within a single data set and whether or not the size of the data distributed across the multiple columns is within the transaction granularity range, wherein processing the data distributed across the multiple columns based on whether or not the data distributed across the multiple columns is contained within a single data set and whether or not the size of the data distributed across the multiple columns is within the transaction granularity range comprises:

if the data distributed across the multiple columns is in a single data set and is within the transaction granularity range, performing a modification or query operation on the data distributed across the multiple columns in a local update manner;

if the data distributed across the multiple columns is not in a single data set and is within the transaction granularity range, performing a modification or query operation separately for data of each data set within the data distributed across the multiple columns in a local update manner; and if the data distributed across the multiple columns is not in a single data set and is not within the transaction granularity range, performing a modification or query operation separately for data of each data set within the data distributed across the multiple columns in a remote update manner.

6. The non-transitory computer-readable medium according to claim 5, wherein the processor-executable instructions, when executed, further facilitate, before dividing the data table:

defining an attribute of the data table, wherein the attribute of the data table comprises: a data type stored in the data table, a length of the data table, and an association relationship between columns in the data table; and applying for memory space according to the attribute of the data table, to create the data table and a data copy area.

7. The non-transitory computer-readable medium according to claim 5, wherein the processor-executable instructions, when executed, further facilitate:

defining an attribute of each data set in the data table as a critical section to facilitate modification and query operations being simultaneously performed.

8. The non-transitory computer-readable medium according to claim 5, wherein the consistency of the data distributed across the multiple columns is ensured by a transactional memory system.

9. A method for concurrent access of mixed services, comprising:

dividing, by a processor, a data table into a plurality of data sets, wherein each data set comprises at least one column in the data table, and columns in the data set are contiguous;

breaking down, by the processor, a modification or query operation on the data table into one or more row operations;

determining, by the processor, whether a row operation of the one or more row operations is applicable to data distributed across multiple columns;

in response to determining that the row operation is applicable to data contained within a single column, determining, by the processor, whether or not the size of the data contained within the single column is within a transaction granularity range; and processing, by the processor, the data contained within the single column based on whether or not the data contained within the single column is within the transaction granularity range, wherein processing the data contained within the single column based on whether or not the data contained within the single column is within the transaction granularity range comprises:

if the data contained within the single column is within the transaction granularity range, performing a modification or query operation on the data contained within the single column in a local update manner; and if the data contained within the single column is not within the transaction granularity range, performing a modification or query operation on the data contained within the single column in a remote update manner.

\* \* \* \* \*